United States Patent [19]

McClure

[11] Patent Number: 4,772,510

[45] Date of Patent: Sep. 20, 1988

[54] FABRIC FOR PROTECTIVE GARMENTS

[75] Inventor: George R. McClure, Claymont, Del.

[73] Assignee: E. I. Du Pont De Nemours and Company, Wilmington, Del.

[21] Appl. No.: 104,462

[22] Filed: Oct. 2, 1987

[51] Int. Cl.$^4$ ............................................. B32B 27/00
[52] U.S. Cl. ................................. 428/286; 428/240; 428/253; 428/284; 428/297; 428/298; 428/421; 428/422
[58] Field of Search ............... 428/284, 286, 421, 422, 428/246, 253, 297, 298

[56] References Cited

U.S. PATENT DOCUMENTS

| | | | |
|---|---|---|---|
| 4,230,654 | 10/1980 | Kuga et al. | 264/134 |
| 4,272,851 | 6/1981 | Goldstein | 2/79 |
| 4,416,946 | 11/1983 | Bolt | 428/421 |
| 4,433,024 | 2/1984 | Eian | 428/246 |
| 4,469,744 | 9/1984 | Grot et al. | 428/422 |
| 4,585,694 | 4/1986 | Dehennau | 428/355 |
| 4,659,625 | 4/1987 | Decroly et al. | 428/412 |
| 4,675,228 | 6/1987 | Little | 428/422 |

OTHER PUBLICATIONS

Du Pont brochure E-32814, "For Hazardous or Dirty Jobs . . . Protect Your Workers with Garments of 'Tyvek'", Spunbonded Olefin (1985-86).

Primary Examiner—James J. Bell

[57] ABSTRACT

A composite fabric that is particularly useful in protective garments has an outer layer of polyvinyl fluoride or polyvinylidene fluoride or copolymers thereof bonded to a film of polyvinyl alcohol polymer or copolymers thereof which in turn is bonded to a textile fabric substrate.

7 Claims, 1 Drawing Sheet

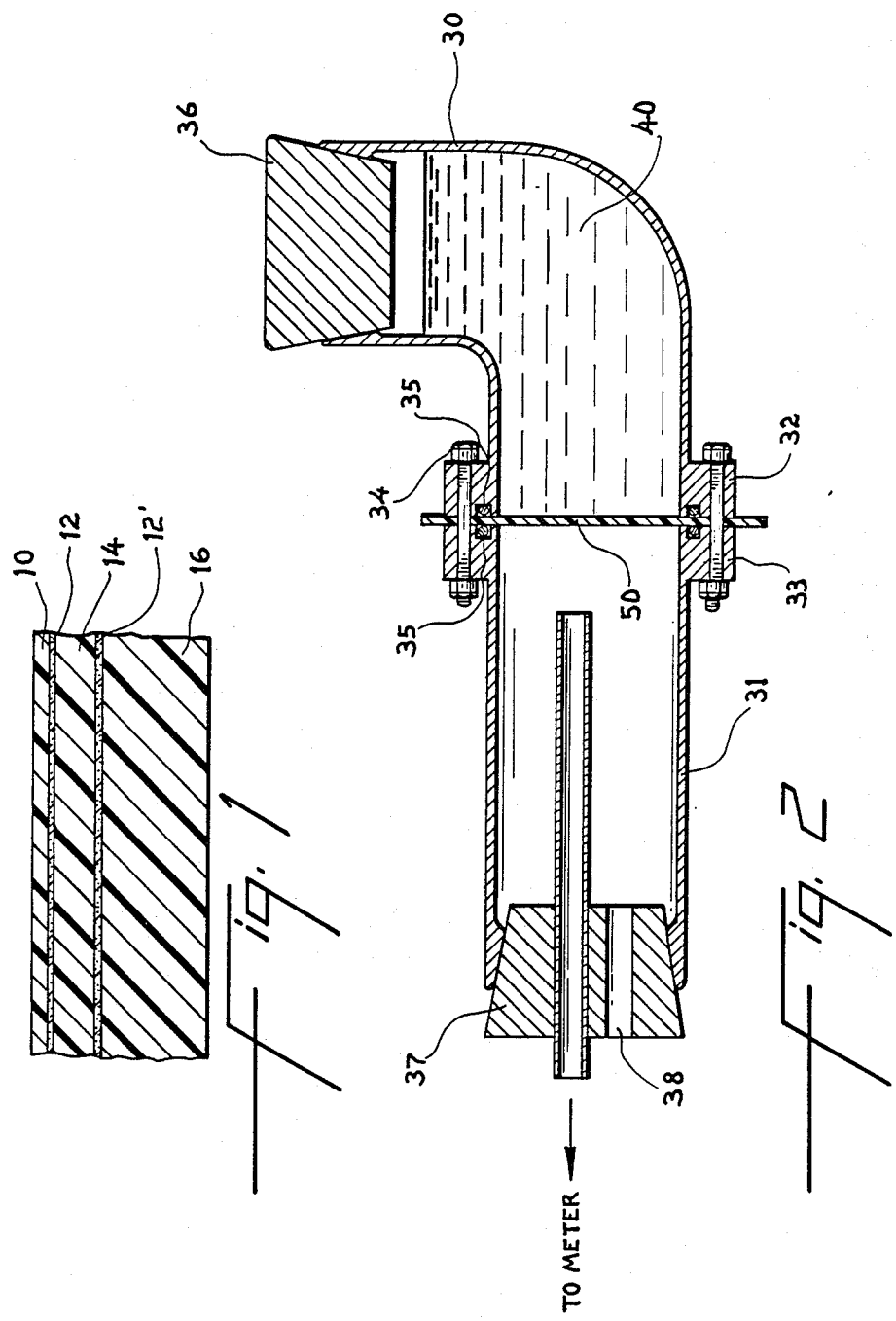

FABRIC FOR PROTECTIVE GARMENTS

BACKGROUND OF THE INVENTION

1. Field of the Invention

This invention relates to a composite fabric suitable for use in garments that provide protection against contact with hazardous substances. More particularly, the invention concerns such a fabric and garments made therefrom that include at least two different film layers and a textile fabric, one film being of polyvinyl or polyvinylidene fluoride and the second film being of polyvinyl alcohol.

2. Description of the Prior Art

Workers in many industries need protection from hazardous substances. Some such protection is often in the form of a disposable, or limited use, outer garment which prevents worker's clothing or skin from contacting the hazardous material. Chemical plant workers, asbestos removers, radioactive-contamination cleaners, chemical-waste disposal workers, and farmers handling various agricultural chemicals and pesticides are among the many users of such protective garments. Such garments need to be as impervious to chemicals as is consistent with safety, comfort and cost. Many of the disposable garments now available commercially provide only short-term protection. Chemicals can pass through such garments in but a few minutes, after which the wearer must immediately leave the work area, remove the contaminated clothing, and bathe. Such short-term protection results in lost production time and, more importantly, in exposure of the worker to the hazardous substances.

Goldstein, U.S. Pat. No. 4,272,851, discloses protective garments made of spunbonded, polyethylene nonwoven sheet (e.g., "Tyvek", sold by E. I. du Pont de Nemours and Company) which may be coated or laminated on one side with a polyethylene film. Du Pont brochure, E-32814, entitled "For Hazardous or Dirty Jobs...Protect Your Workers with Garments of "TYVEK" Spunbonded Olefin" discloses garments made from the spunbonded olefin nonwoven sheets laminated with coextruded, multilayered thermoplastic film (e.g., "Saranex", sold by Dow Chemical Company) along with the permeation characteristics of these laminated sheets. "Saranex" is a three-layered laminate of "Saran" vinyl chloride/vinylidene chloride copolymer film, sandwiched between two layers of polyethylene. Research Disclosure, 12410 (Aug. 1974), discloses protective garments of spunlaced aramid fiber (e.g., "Nomex", sold by E. I. du Pont de Nemours and Company).

Though not related to fabrics for protective garments, Dehennau, U.S. Pat. No. 4,585,694, and Decroly and Dehennau, U.S. Pat. No. 4,659,625, disclose films of polyvinyl fluoride or polyvinylidene fluoride bonded to another polymer. Kuga et al, U.S. Pat. No. 4,230,654, discloses polyvinyl alcohol films coated with copolymer compositions. Bolt, U.S. Pat. No. 4,416,946, discloses a film of polyvinyl alcohol laminated to a substrate, such as a fluorocarbon material, which is then treated with iodine to form a polarizing sheet.

The known protective garments have enjoyed some commercial success. However, fabrics are needed that would provide the protective garments with longer times before hazardous substances could permeate or pass through the fabric; an increase in the so-called "hold-out time" of the hazardous substances by the fabric would enhance the utility of protective garments made therefrom. Accordingly, an object of this invention is to provide such an improved fabric for use in protective garments.

SUMMARY OF THE INVENTION

The present invention provides an improved composite fabric that is particularly suited for use in a protective garment. The fabric is of the type that includes a film bonded to a textile fabric substrate. The improvement of the present invention comprises an outer polymeric film selected from the group consisting of polyvinyl fluoride (hereinafter also referred to as "PVF"), polyvinylidene fluoride (hereinafter also referred to as "PVF$_2$") and copolymers thereof, bonded to a second film selected from the group consisting of polyvinyl alcohol (hereinafter also referred to as "PVA") polymer or copolymers, the second film being bonded to the textile fabric substrate. The bonding between the layers may be provided by adhesives, by thermal bonding, by casting one film layer on the other, solvent bonding, or the like. The textile substrate may be woven, knitted or nonwoven, but for reasons of economy, nonwoven fabrics are preferred.

In a preferred embodiment of the composite fabric of the invention, the outer film is of polyvinyl fluoride, the second film is of polyvinyl alcohol, the textile substrate is a spunbonded sheet of polyethylene plexifilamentary film-fibril strands and the bonding of the components is provided by adhesive layers.

In protective garments of the invention, the textile substrate of the composite fabric usually forms the inner surface of the garment and the polyvinyl fluoride film forms the outer surface.

Composite fabrics of the invention exhibit hold-out times for various chemicals that are several fold greater than the hold-out times provided by known commercial protective fabrics.

BRIEF DESCRIPTION OF THE DRAWINGS

The invention will be better understood by reference to the drawings in which FIG. 1 presents a cross-section view of an improved composite fabric of the invention and FIG. 2 is a cross-sectional representation of a laboratory apparatus used in Examples II and III for determining the hold-out times of test fabrics against various liquids. In FIG. 1, 10 is a film of polyvinyl fluoride (or polyvinylidene fluoride), 12 and 12' are layers of adhesive, 14 is a film of polyvinyl alcohol, and 16 is a textile fabric substrate.

DETAILED DESCRIPTION OF PREFERRED EMBODIMENTS

The composite fabric of the invention is incorporated into a protective garment such that the fluoride-containing film 10 is positioned on the outside of the garment and the textile fabric substrate 16 is positioned on the inside of the garment, (i.e., next to the user's body).

Conventional methods are suitable for laminating the films to each other and for laminating the PVA film to the textile fabric substrate. Adhesives based on polyesters, polyacrylics, polyurethanes, isocyanates and the like are suitable. Because the PVF and PVF$_2$ films are resistant to adhesion, treatments, such as Lepel or flame treatments, are usually employed to provide active sites for adhesion on the film surface. These, and other such treatments, are well known in the art. Other known techniques, such as solvent bonding and the like can be employed.

Lamination of the polyvinyl alcohol film surface to the textile fabric can be accomplished by the same adhesives used to laminate the films. In addition, hot calendering or hot-melt adhesion methods, as well as other known bonding techniques, can be used.

Protective garments (e.g., shirts, gowns, aprons, coveralls, etc.) are formed by first cutting the composite fabric into the desired shape, followed by seaming to combine the cut parts. The seams may be formed by ultrasonic bonding, thermal point-bonding, gluing, sewing with thread, or by other equivalent means. If the seams are made by stitching, the needle holes should be covered (e.g., by a protective tape) to block possible seepage paths for liquid from the outer surface to the interior of the fabric.

Suitable thicknesses for the various components of the composite fabric of the invention generally are in the range of 0.01 to 0.10 mm for the polyvinyl fluoride (or polyvinylidene fluoride) layer, 0.01 to 0.05 mm for the polyvinyl alcohol layer and at least 0.05 mm for the support fabric.

More than one PVF/PVA film laminate can be present in a composite fabric of the invention. Such a fabric would provide further resistance to chemical penetration, but the additional layers reduce wear comfort and increase cost. Nonetheless, in certain adverse environments, such additional layers may be desirable. For example, a composite fabric of the invention, which is made with a textile fabric substrate that is bonded on both its surfaces to PVA/PVF laminates, is often preferred for such adverse environments. (The PVF film, of course, forms the outermost layers.) In another embodiment of the invention in which both sides of the textile fabric substrate are coated, the PVA film may be omitted from the side of the fabric intended for the inside of the protective garment.

The various polymeric layers of the composite fabric of the invention also can contain conventional amounts of additives, such as pigments, stabilizers, plasticizers, and the like, so long as these additives do not significantly detrimentally affect the over-all protective characteristics of the composite fabric.

In the Examples which follow, two types of instruments were used to test the resistance of samples to permeation or breakthrough by various chemicals. The time required for such permeation or breakthrough, called "hold-out time" was measured for the specimens of Example I in accordance with American Society of Testing Materials Method ASTM 739-85. In Examples II and III, the laboratory apparatus of FIG. 2 was used for hold-out time measurements. The laboratory apparatus includes two primary glass parts; elbow 30 and horizontal cylinder 31. A test fabric specimen 50 is placed between the flanged ends 32 and 33 of glass members 30 and 31. The two glass members are held together by bolts 34 which in cooperation with O-rings 35 to hold test specimen 50 flat in place. Test liquid 40 is placed in elbow 30 so that it fills the vertical arm of the elbow to a height of about 5 cm above the axis of the horizontal arm. A loose fitting stopper 36 prevents excessive loss of vapors from the elbow. A stopper 37, containing passage 38 and sampler tube 39, is placed in the other end of horizontal cylinder 31. Air is gently circulated from inside horizontal member 31, through sampler tube 39, to a Combustible Gas Indicator (not shown), Model 40, manufactured by Mine Safety Appliance, Pittsburgh, Pa. The instrument is calibrated against 2% methane in air. The organic liquids that are tested in the apparatus are sufficiently volatile, so that substantially immediately after permeation through the test fabric, enough vapor is generated to be picked by sampler tube 39 to be detected by the Combustible Gas Indicator. When the apparatus is used to test hold-out time against acidic or basic liquids, a piece of moistened litmus paper is placed in horizontal cylinder 31 to detect breakthrough.

In the examples which follow, the starting materials include at least some of the following:

"Tedlar" TTR05AG2 polyvinyl fluoride (PVF) film, sold by E. I. du Pont de Nemours & Co., Wilmington, Del., of 0.00125-mm (0.0005-inch) thickness and having been flame-treated on one surface for improved adhesion.

"Kynar" polyvinylidene fluoride ($PVF_2$) sold by Penwalt Corp. and extruded into film of 0.076-mm thickness by Westlake Co., Lenni, Pa.

"Mono-Sol" 1.0015-3 polyvinyl alcohol (PVA) film of 0.038-mm thickness, sold by Chris Craft Industrial Products Inc., Gary, Ind.

"Tyvek" Type 1422A spunbonded olefin, a nonwoven sheet sold by E. I. du Pont de Nemours & Co., Wilmington, Del., having a unit weight of 39 g/m$^2$ and a thickness of 0.13 mm.

"Adcote" 333, an isocyanate-terminated prepolymer adhesive, dissolved in methylethyl ketone, sold by Morton Chemical Co., Chicago, Ill.

EXAMPLE I

This example illustrates the fabrication of a composite fabric of the invention and demonstrates its superior hold-out-time characteristics for several liquids in comparison to a commercial composite fabric intended for protective garments.

In this example, an Inta Roto coater/laminator, sold by Inta Roto Company of Richmond, Va., was employed to prepare the composite fabric of the invention. First, a solution of "Adcote" 333 in methylethyl ketone, having a Zahn #2 cup viscosity rate of 25 seconds, was coated on the surface of a length of "Tedlar" PVF film with a gravure roll that had 43.3 lines per cm of roll width. The adhesive-coated PVF film was then passed through a 3.35-meter long oven, which was heated to a temperature in the range of 57° to 63° C. Residence time in the oven was 44 seconds. The resultant coated-and-heated PVF film was then brought into face-to-face contact with a length of "Mono-Sol" PVA film and passed through a nip formed by a polished, chrome-surfaced roll that was heated to 74° C. and an elastomer-covered backup roll having a 70 Shore A durometer hardness. The nip applied a load of 175 N/cm (100 lb/inch) of nip width. "Adcote" 333 solution was then applied with the above-described gravure roll to the PVA surface of the PVF/PVA film laminate and then laminated to a length of "Tyvek" spunbonded olefin sheet by means of the same oven and nip as was used for making the PVF/PVA film laminate; oven temperature was in the range of 65° to 70° C., oven residence time was 26 seconds and nip load was 175 N/cm.

Samples of the PVF/PVA/"Tyvek" composite fabric of the invention, prepared as described in the preceding paragraph, and samples of a prior-art, commercial composite fabric "Saranex"/"Tyvek" were tested for resistance to breakthrough by various chemicals in accordance with American Society of Testing Materials Method ASTM 739-85. "Saranex", which is sold by Dow Chemical Company, is a three-layered film laminate of "Saran" sandwiched between two layers of polyethylene. "Saranex"/"Tyvek" laminates are sold by Shawmut, Inc. of Boston, Mass., among others. The time for a given chemical to break-through or penetrate a fabric sample (i.e., hold-out time) was measured. Samples were tested for a maximum of 480 minutes.

TABLE I

| Chemical | Hold-out Time, minutes | |
| --- | --- | --- |
| | Invention | Prior Art |
| carbon disulfide | >480 | 0 |
| diethyl ether | >480 | 120 |
| ethyl acetate | >480 | 45 |
| methylene chloride | 45 | 0 |
| tetrahydrofuran | 13 | 0 |

In the preceding table, >480 min means that no breakthrough was detected before the test was terminated and 0 min means that breakthrough was detected almost immediately.

EXAMPLE II

This example demonstrates the unexpectedly advantageous and synergistic effects of composite fabrics of the invention in prolonging hold-out, as compared to individual layers of which the composite fabric is composed.

"Adcote" 333 adhesive solution was coated with a #20-wire-wound rod onto the flame-treated surface of a 30-by-30 cm sample of "Tedlar" PVF film. The coated PVF film was permitted to remain in air at room temperature for 15 minutes so that substantially all the methylethyl ketone solvent evaporated from the adhesive coating. A 30-by-30 cm sample of "Mono-Sol" PVA film was placed on the adhesive-coated surface of the PVF film, smoothed to remove air pockets, and then subjected in a laboratory press to a pressure of 6.89 kPa (1 psi) and a platen temperature of 75° C. for 2 minutes. Another coating of "Adcote" 333 adhesive solution was applied to the PVA surface of the PVA/PVF laminate, dried in air for 15 minutes at room temperature and then laminated to a 30-by-30 cm sample of "Tyvek" spunbonded olefin sheet in the laboratory press under a 6.89-kPa pressure for 2 minutes with a platen temperature at 75° C., to form a composite fabric of the invention, designated Sample II in the table below.

Specimens of Sample II were tested with the laboratory apparatus of FIG. 2 for the "hold-out time" of various chemicals. Hold-out times were also measured for samples of (1) "Mono-Sol" PVA film, designated Comparison A and (2) a composite of "Tedlar "PVF film and "Tyvek" spunbonded olefin composite, designated Comparison B. Note that if there were no synergism among the components of the composite of Sample II, then the hold-out time of this composite fabric of the invention would merely be the sum of the hold-out times of Comparisons A and B. However, as is clearly shown by the Table below, the composite fabric of the invention (Sample II) showed a exhibited a surprisingly synergistic effect. Hold-out times for Sample II were at least 1.85 times to greater than 14 times longer than the sum of the hold-out times of Comparisons A and B.

TABLE II

| | Hold-out Time, minutes | | |
| --- | --- | --- | --- |
| | Sample | Comparisons | |
| Liquid | II | A | B |
| methylethyl ketone | >360 | 15 | 60 |
| methanol | >420 | 10 | 90 |
| methylene chloride | >420 | 15 | 15 |
| tetrahydrofuran | >360 | 60 | 135 |
| 27% ammonium hydroxide | 45 | 0 | <15 |

EXAMPLE III

The procedure of the second paragraph of Example II was repeated, except that "Kynar" polyvinylidene fluoride (PVF$_2$) film replaced the "Tedlar" polyvinyl fluoride (PVF) film. Hold-out times were measured with the apparatus of FIG. 2. The hold-out time for the PVF$_2$/PVA/"Tyvek" composite fabric was 180 minutes for methylethyl ketone and greater than 420 minutes for methylene chloride.

I claim:

1. An improved composite fabric, particularly suited for use in a protective garment, which includes a polymeric film layer bonded to a textile fabric substrate, the improvement comprising a first polymeric film selected from the group consisting of polyvinyl fluoride, polyvinylidene fluoride and copolymers thereof, bonded to a second polymeric film selected from the group consisting of polymers and copolymers of polyvinyl alcohol, the second film being bonded to a textile fabric substrate.

2. A composite fabric of claim 1 wherein the textile fabric substrate is a nonwoven fabric.

3. A composite fabric of claim 1 wherein the textile fabric substrate is a spunbonded nonwoven sheet of polyethylene plexifilamentary film-fibril strands.

4. A composite film of claim 1, 2 or 3 wherein the second surface of the textile fabric substrate is bonded to a third polymeric film selected from the same group as the first polymeric film.

5. A composite film of claim 5 wherein a fourth polymeric film selected from the same group as the second polymeric film is positioned between the third polymeric film and the textile fabric subtrate.

6. A composite fabric of claim 1, 2 or 3 wherein an adhesive bonding layer is positioned between the first and second films and between the second film and the textile fabric substrate.

7. A protective garment made from a composite fabric of claim 1 wherein the textile fabric substrate forms the inside surface of the garment and the film of polyvinyl fluoride, polyvinylidene fluoride or copolymers thereof forms the outside surface of the garment.

* * * * *